United States Patent [19]
Perry

[11] 3,929,025
[45] Dec. 30, 1975

[54] AUTOMATIC SHIFT CONTROL FOR BICYCLES AND THE LIKE

[76] Inventor: Robert E. Perry, 852 W. Las Palmas Drive, Fullerton, Calif. 92635

[22] Filed: Dec. 13, 1974

[21] Appl. No.: 532,509

[52] U.S. Cl. ............................................ 74/217 B
[51] Int. Cl.² ...................... F16H 9/00; F16H 11/06
[58] Field of Search ........................... 74/217 B, 337

[56] References Cited
UNITED STATES PATENTS
3,613,466  10/1971  Houghton .......................... 74/217 B

*Primary Examiner*—Samuel Scott
*Assistant Examiner*—Allan R. Burke
*Attorney, Agent, or Firm*—Philip M. Hinderstein

[57] ABSTRACT

An automatic shift control for a vehicle, such as a bicycle, of the type including a frame, at least one wheel, a crank, a chain interconnecting the wheel and the crank, and means for changing the rotation ratio between the wheel and the crank. The automatic shift control operates the ratio changing means by sensing changes in chain tension which result from variations in pedal pressure used to propel the bicycle and includes a control arm mounted for rotation around a fixed point on the frame, the arm being positionable in any one of multiple positions; means interconnecting the control arm and the ratio changing means for selecting one of multiple ratios depending upon the position of the control arm; a chain-engaging idler wheel mounted on the control arm, chain tension tending to cause rotation of the control arm in one direction; and a tension spring connected to the control arm for applying a force thereto tending to cause rotation thereof in an opposite direction. The control arm is in equilibrium for a selected chain tension in all of the multiple positions of the control arm and only a difference between actual chain tension and the selected chain tension causes rotation of the control arm in a direction to eliminate such difference. The control arm senses the above difference at a point in the pedaling cycle where the selected chain tension is consistent and the control arm is limited to moving one position for each rotation of the pedals.

24 Claims, 20 Drawing Figures

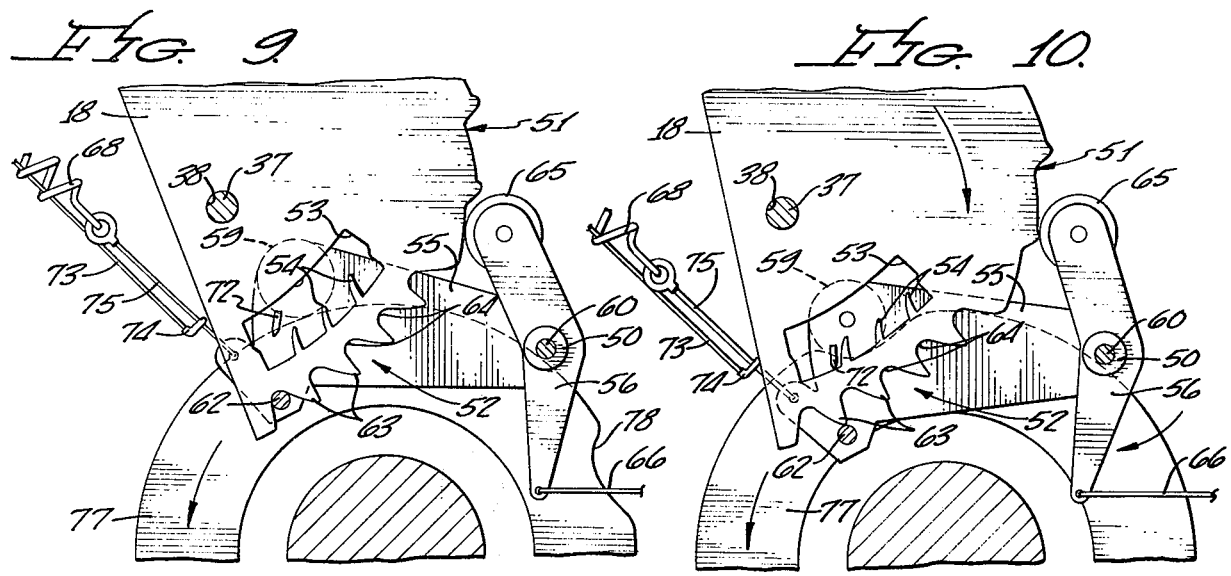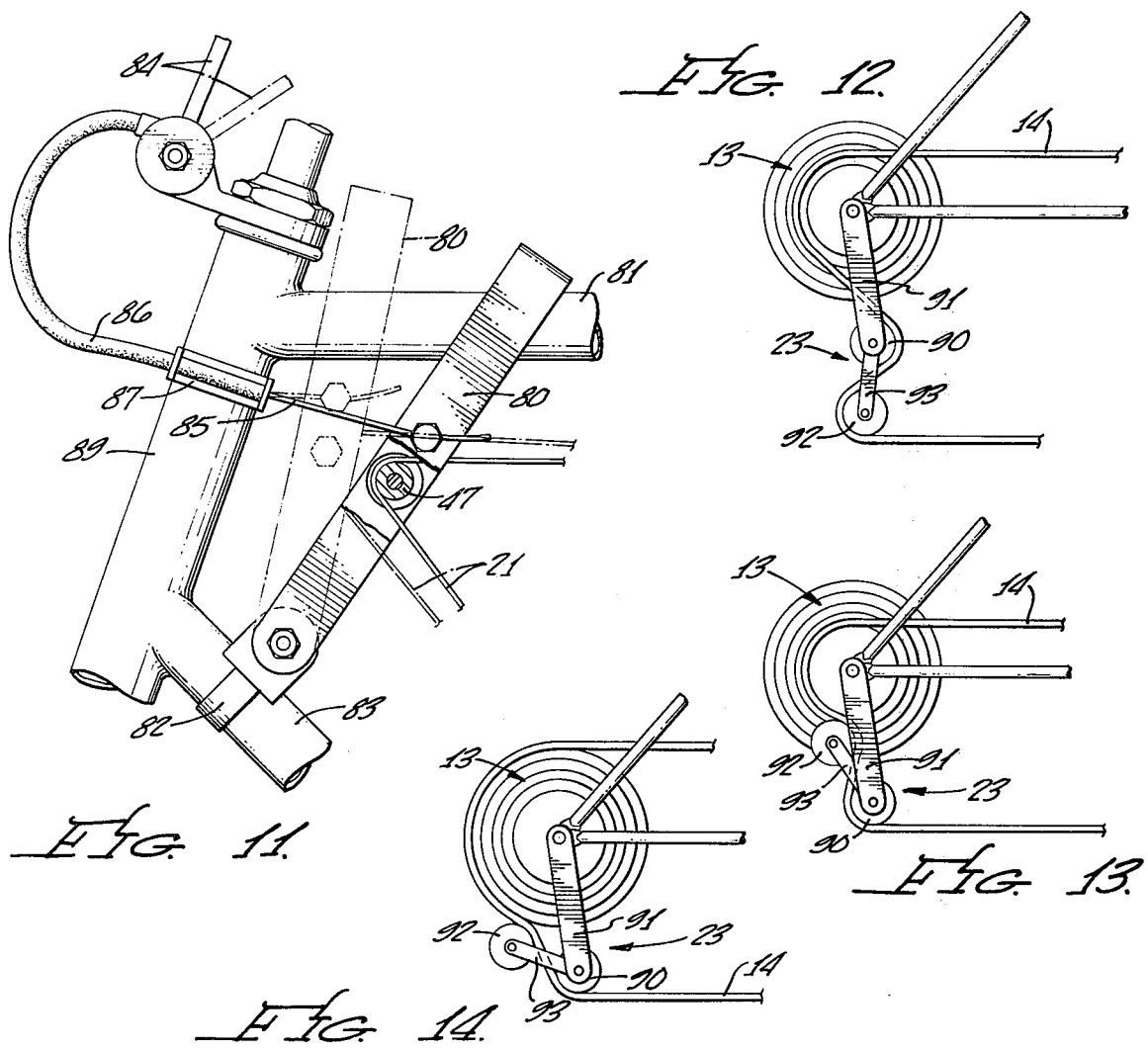

AUTOMATIC SHIFT CONTROL FOR BICYCLES AND THE LIKE

BACKGROUND OF THE INVENTION

1. Field of the Invention

The present invention relates to an automatic shift control for bicycles and the like and, more particularly, to a control mechanism for automatically selecting one of multiple gear ratios in a bicycle or the like such that the bicycle transmission is in equilibrium throughout the entire range of available gear ratios and only responds to a difference between actual pedal pressure and a desired pedal pressure.

2. Description of the Prior Art

A unicycle, bicycle, tricycle, or any other vehicle propelled by human pedal pressure is powered by a biological engine rated at about 0.4 horsepower at 60 RPM. As is the case with essentially all powered vehicles, designers provide a selection of rotation ratios between the input and the output so that an optimum power output can be maintained under various road conditions. Furthermore, because human powered bicycles and the like are relatively underpowered, they have a greater need for a wide range of variable input/output ratios. For example, a 10 MPH headwind or a 10 percent grade will consume half the available horsepower.

Unless the input/output ratio is shifted rapidly and often, over relatively small increments to match power demands, the pedaling speed will fluctuate. As a result, like any powered vehicle, the bicycle's engine, the human operator, will labor or race. In either case, inefficiency, discomfort, and fatigue result.

Since the above problem has been recognized as long as there have been bicycles and other human powered vehicles, gearshifting transmissions have been in use for a number of years and a wide variety of such transmissions are available. The most popular and efficient (in terms of transmission losses) is the derailleur transmission which is nearly 100 years old. However, while an expert cyclist can make good use of the gear ratios available, the average cyclist does not. The reasons can be categorized as practical, physiological, and psychological.

Practically, derailleur transmissions are awkward to shift. Most do not even indicate shift positions on the shift control lever. The reason is simply that "over shifting" is the method used to select gears. That is, to shift rapidly and surely from a first gear to a second, it is necessary to first move the shift control lever beyond the second gear. Only after the shift is made, can the shift control lever be moved back to the second gear. As a result, there is no positive positioning of the shift control lever. Therefore, to be certain that the correct gear is engaged, it is necessary to look down and back toward the rear wheel hub. Traffic hazards being what they are, riders usually forego this nicety and simply push the shift control lever generally down or up and then adjust it until the sound of grinding gears and chain diminshes.

An additional problem results from the fact that a 10-speed derailleur transmission is a real mystery to the majority of cyclists. Again the reason is both practical and simple. People who have difficulty memorizing a 4-speed transmission shift pattern for an automobile are expected to master a bicycle shift pattern that typically follows the following sequence:

| Speed | Front Gear | Rear Gear |
|---|---|---|
| first | 1 | 1 |
| second | 1 | 2 |
| third | 2 | 1 |
| fourth | 1 | 3 |
| fifth | 2 | 2 |
| sixth | 1 | 4 |
| seventh | 2 | 3 |
| eighth | 1 | 5 |
| ninth | 2 | 4 |
| tenth | 2 | 5 |

Obviously, the shift sequence must be mastered in both directions to get the most out of the gears. Since that is difficult, the result is that most riders treat a 10-speed bicycle like a 5-speed bicycle. That is, they more or less ignore the front chain wheel gears until the going becomes desperate at either end of the gear range.

On the other hand, there are transmission systems, notably the planetary gear sets in rear or chain wheel hubs, that have positive, easy, and indexed shifting. However, such transmission systems have certain problems in range and frictional losses and, in any event, problems in effective and efficient gearshifting still exist.

A healthy adult can easily generate 1 horsepower by burning oxygen reserves in his muscular tissues. However, this capacity rapidly decays. In about five minutes, the output is about 0.4 horsepower and declines steadily thereafter. At the end of a full capacity one hour ride, the output is about 0.25 horsepower. Unfortunately, most riders do not fully appreciate this phenomenon. Because of the reserve power capacity, a degree of pedal effort that will lead to complete exhaustion seems trivial to a fresh rider. Because it is difficult to sense the degree of pedal effort that will lead to fatigue, the tendency is to defer shifting. Thus, the gradually increasing headwind or the gradually increasing slope are ignored until the strain becomes severe. A shift initiated at this poiint is likely to be to the lowest gear, rather than to the one which efficient utilization of power would have dictated.

Curiously then, the shifting of most cyclists is based on criteria of fatigue and strain. It is much as though an automobile automatic transmission responded only to an overheated or stalled engine. Most cyclists are intelligent enough to know that an automobile cannot be operated in this manner. However, the psychological factor causes the same cyclist to defer shifting because he finds it difficult to convince himself that he needs to, until he has burned his energy reserves. He is also reluctant to shift because, as discussed above, it is an awkward business which detracts both from the pleasure and safety of the ride.

What is evidently required is an automatic shift control for bicycles and the like. An automatic shift control would make bicycles and other human-powered vehicles far more efficient machines in that it would continuously act to make the best possible use of the propulsive power. The average cyclist would find it possible to ride longer, faster, and with less fatigue and more enjoyment than ever before. The increased enjoyment would stem from the fact that the rider would be relieved of the necessity of making an unending series of dubious decisions concerning shifting. Even so, perhaps the greatest advantage is simply that the rider is relieved of the distraction of physically controlling the shift mechanism and peering down and back to check operation. Obviously, safety improves substantially if the cyclist is able to look where he is going at all times.

An effective automatic shift control should act to insure a steady pedal effort and hence a steady cadence through the range of available transmission gearing. For example, a cyclist may be riding in top gear on level ground with a pedal effort of approximately 20 pounds, that is, each leg will exert a force of 20 pounds as each pedal rotates to the forward position. Now, should the rider encounter a moderate incline, pedal effort may increase to 22 pounds. If an automatic shift control responds to a difference of 2 pounds between a desired pedal effort and an actual pedal effort, the automatic shift control should shift to the next lower gear. The rider would notice the shift as an apparent small slip in the pedaling and as a solid subdued thud as the new gear engages. Pedal effort would then return to 20 pounds and the rider would continue at the same efficient force and cadence, but at a reduced speed.

If the incline now steepens or a headwind is encountered, resulting in the hypothetical 2 pound increase in pedal effort, the automatic shift control should again shift down. Such an automatic shift control ideally samples pedal effort with each revolution of the chain wheel and continues shifting up or down, one gear at a time, until the appropriate gear for a continued steady power output is found.

In spite of the obvious advantages of an automatic shift control for bicycles and the like and in spite of the fact that numerous attempts have been made heretofore to produce an operative device, no known mechanism is available which is fully operational. One proposed device is described in U.S. Pat. No. 3,613,466 to George F. Houghton, entitled "Automatic Gearshift for Bicycle," issued Oct. 19, 1971. The mechanism of Houghton includes a spring-restrained idler over which the bicycle chain is passed. Since pedal effort exerted in riding a bicycle is reflected in chain tension, the position of the idler can be set to be in equilibrium for a selected degree of pedal effort. Superficially, it would appear that if pedal effort increased, the idler would sense the greater chain tension and would be pulled downwardly. Conversely, if chain tension decreased, the idler would rise. Theoretically, the motion of the idler can be used to control any one of a number of variable power transmission devices for bicycles. In the Houghton patent, the idler is directly connected to the gearshift lever so that movement of the idler varies the position of the lever resulting in a shifting of the gears.

Unfortunately, examination of the forces involved and the design constraints to be accommodated indicates that the chain-tension sensing is inoperable in the simple configuration shown in the Houghton patent. The principal fallacy is that such a device is stable only in the gear for which pedal effort equilibrium is initially established. If pedal effort increases, the idler wheel will move down and initiate a shift to a lower gear. However, as soon as this occurs, the mechanical advantage thus attained will lessen both pedal effort and chain tension. The idler senses this decrease in chain tension, moves up, and initiates a shift to a higher gear. The result is that the mechanism promptly shifts back and forth until the mechanism or the cyclist's patience fails.

Another proposed solution is found in U.S. Pat. No. 2,584,447 to Louis A. Hayot, entitled "Variable-Speed Chain Driving Device", issued Feb. 5, 1952. The device of Hayot includes a hub to which the pedals of the bicycle are attached, the hub including a plurality of flexible arms so that the diameter thereof varies in response to chain tension, thereby permitting an automatic and continuous gear ratio change. However, as was the case with the device of the Houghton patent, the device of the Hayot patent is also stable only with the arms in the position for which pedal effort equilibrium is initially established. That is, if pedal effort increases, causing a compression of the arms and a reduction of the diameter of the hub, the mechanical advantage thus attained will lessen both pedal effort and chain tension, causing an immediate expansion of the arms. The result is that the arms oscillate inwardly and outwardly with cyclic pedal effort until the mechanism fails.

From the above analysis it becomes clear that the principal requirement for a chain-tenion sensing system is that it be in equilibrium for a selected chain tension in all possible gear positions. Since a functional system will be stable in any gear position, such a system must respond only to variations in chain tension.

In addition, shifting must be accomplished with relatively small variations of pedal effort over or under the selected level. This constraint results from the fact that bicycle gearing is quite close, to match the limited capacities of the human power source. As a practical matter, a simple 10% advantage between gears is not uncommon.

The fact that a variation in chain tension must trigger shifting immediately directs attention to another severe design constraint which has not been fully considered heretofore. That is, the human engine for the bicycle is a highly cyclic power source. Little or no pedal effort is reflected in chain tension when the pedal cranks pass through top and bottom dead center. Since the engine is most efficient at about 60 RPM at the chain wheel, the chain will normally be pulsed from near slack to full tension approximately 120 times a minute. The phenomenon of chain-tension pulsing requires that a selected degree of pedal effort be sensed either as an average value or at a point on the pedaling cycle where effort is consistent.

SUMMARY OF THE INVENTION

According to the present invention there is provided a fully operative automatic shift control for bicycles and the like which solves the problems discussed above in a manner unknown heretofore. The present automatic shift control utilizes the principle of chain-tension sensing since chain tension is directly proportional to pedal effort exerted in riding the vehicle. The present system periodically compares actual chain tension and a selected chain tension and initiates a change in gear ratio when the difference therebetween exceeds a predetermined amount. However, with the present mechanism, the system is in equilibrium for the selected chain tension in all possible gear positions and only responds to a difference between actual pedal pressure and a desired pedal pressure.

With the present system, shifting is accomplished with relatively small variations of pedal effort over or under the selected level. Furthermore, not only is the selected level adjustable but the degree of permissible variation of pedal effort over or under the selected level is also adjustable.

Considering the phenomenon of chain-tension pulsing, the present system operates to sample chain tension at a selected point on the pedaling cycle where pedaling effort is both consistent and maximum. Only when the actual pedal pressure differs from the selected pedal pressure by a predetermined amount at this specific location on the pedaling cycle with a shift to a different gear result. Furthermore, shifting is accomplished one step at a time to insure a steady, consistent shifting pattern and to avoid slipping between gears.

Briefly, the present automatic shift control for bicycles and the like is applicable to existing externally shiftable bicycles with a minimum of modification required. The present shift control consists of two base plates which attach to either side of the bicycle frame, immediately above the chain wheel hub. Bearings in the base plates carry a pivotable control arm which supports a chain-engaging idler wheel over which the bicycle chain passes. The chain then passes under an idler wheel fixed to the base plate and then to the gear cluster at the rear wheel. The control arm is restrained from moving with chain tension by a cable passing under a pulley fixed to the base plate. The cable is secured to a spring fixed to the frame.

The length of the control arm, the position thereon of the control arm idler wheel relative to the pivot point of the control arm, and the angle of the chain over the control arm idler wheel are selected so that the control arm is approximately in equilibrium for a selected chain tension in all of multiple positions of the control arm. Movement of the control arm between the multiple positions is utilized to shift the bicycle gears by means of a stepped cam on the control arm body. A cam follower moves a shift crank to activate the transmission through a connecting cable.

The control arm body also carries a plurality of detents corresponding to the shift cam step positions and a detent arm, pivoted on the same axis as the shift crank, carries a pin to engage the several detents. A spring is secured to the end of the detent arm and anchored to the bicycle frame. Adjusting the detent spring establishes the shift range — that is, the force over or under the preset pedal effort which is required to shift to the next appropriate gear. Furthermore, an escapement mechanism, consisting of a second pin on the detent arm, engaging a specially contoured opening in the control arm, requires that each detent be fully engaged in turn so that the transmission will shift only to the next appropriate gear and not skip gears.

Finally, a detent release cam secured to the chain wheel serves to sample pedal effort at a precise point in the pedaling cycle where it is consistent and, preferably, maximum. A cam follower on the detent arm permits its momentary release only when one pedal is in the selected position. If a shift to the next gear is appropriate at this time, the detent will release the control arm to the next appropriate position and the cam will hold it there for one full chain wheel revolution to assure a complete movement of the chain to the next gear on the cluster.

In addition to its capability of automatically controlling the shifting of a bicycle, the present system has additional capabilities. Thus, in operation, it may be that a rider sees that an incline encountered is steep, but not too long, In that case, rather than slow the bicycle, he may prefer to let the transmission shift down but one or two gears and then lock it in that gear. The present shift control permits him to lock the shift control in any desired position. He could then use his own power reserves to crest the incline and upon reaching the far side, a release of the shift lock will permit the transmission to shift back up to top gear for the level or downhill run.

If the downhill run restores the rider's energies, the rider may decide that he can afford a greater level of exertion. In that case, the present automatic shift control permits him to move his "shift range" control so that rather than shifting at the before-mentioned hypothetical value of 2 pounds over the base pedal effort of 20 pounds, the transmission will shift at 4 pounds over or under. The effect will be to remain longer in each gear. Alternatively, since the present shift control permits an adjustment of the basic pedal effort, the rider may elect to use the "pedal effort" control to set the basic pedal effort to a higher value, such as 22 pounds. If the shift range remains the same, shifts will occur with the same frequency, but the system will be stable in a higher gear. Thus, if the cyclist's cadence remains the same, the effect will be to increase the average speed of the bicycle.

OBJECTS

It is therefore an object of the present invention to provide an automatic shift control for bicycles and the like.

It is a further object of the present invention to provide a mechanism for automatically selecting one of multiple gear ratios in a bicycle or the like such that the bicycle transmission is in equilibrium throughout the entire range of available gear ratios and only responds to a difference between actual pedal pressure and a desired pedal pressure.

It is a still further object of the present invention to provide an automatic shift control for bicycles and the like where shifting is accomplished with relatively small variations of pedal effort over or under a selected level.

It is another object of the present invention to provide an automatic shift control for bicycles and the like including means for selecting the value of a desired pedal pressure.

It is still another object of the present invention to provide an automatic shift control for bicycles and the like including means for selecting the value of the permissible difference between the actual and a desired pedal effort at which point shifting is initiated.

Another object of the present invention is the provision of an automatic shift control for bicycles and the like where the selected degree of pedal effort is sensed at a point on the pedaling cycle where such effort is consistent.

Still another object of the present invention is the provision of an automatic shift control for bicycles and the like utilizing a derailleur transmission which includes provision for a precisely registered position of the derailleur mechanism for each gear position.

An additional object of the present invention is an automatic shift control for bicycles and the like including a derailleur mechanism including provision for a constant chain slack regardless of gear position. This provision permits positioning of the derailleur jockey wheel close to the bicycle gears to insure immediate and positive gear shifts. This also permits elimination of the low hanging derailleur tension wheel.

Still an additional object of the present invention is an automatic shift control for bicycles and the like which includes provision for manual selection of either an automatic mode or a lock in of any selected gear.

Another object of the present invention is the provision of an automatic shift control for bicycles and the like which may be readily fitted to existing bicycle constructions.

Still other objects, features, and attendant advantages of the present invention will become apparent to those skilled in the art from a reading of the following detailed description of the preferred embodiment constructed in accordance therewith, taken in conjunction with the accompany drawings wherein like numerals designate like parts in the several figures and wherein:

BRIEF DESCRIPTION OF THE DRAWINGS

FIG. 9 is a rear sectional view taken along a vertical plane passing between the control arm and the front base plate, with the shift position detent arm in its uppermost position;

FIG. 10 is a rear sectional view like FIG. 9 with the shift position detent arm in its lowermost position;

FIG. 11 is a rear elevation view of the pedal effort control of the present automatic shift control;

FIG. 12 is a diagramatic representation of a conventional derailleur mechanism as known in the prior art; and FIGS. 13 and 14 are diagramatic representations of an improved derailleur mechanism for use with the present automatic shift control with the drive chain shown in the high gear and low gear positions, respectively.

DESCRIPTION OF THE PREFERRED EMBODIMENT

THEORETICAL ANALYSIS

The present automatic shift control will be described as being applied to a bicycle and, more particularly, to a bicycle having a 5-speed derailleur mechanism of a type well known to those skilled in the art. However, and as will appear more fully hereinafter, it will be obvious to those skilled in the art that the present shift control is applicable to any human-powered vehicle of the type including a frame, at least one wheel, a crank, a chain interconnecting the weheel and the crank, and a means for changing the rotation ratio between the wheel and the crank.

Figure 1A:
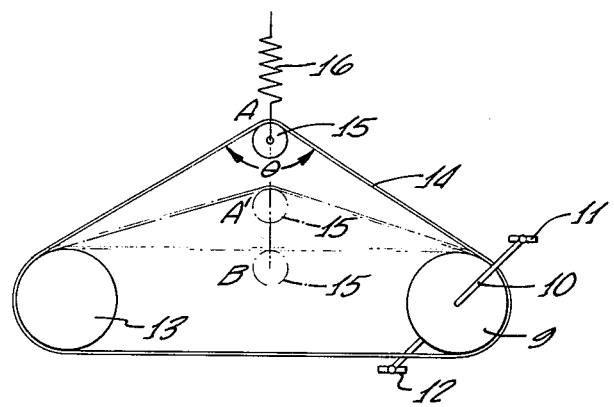
FIG. 1A is a diagramatic representation of the major elements of a prior art automatic shift control for a bicycle.

Referring now to FIG. 1A, there is shown diagramatically the major elements of a bicycle including a crank 10 which is rotated by a pair of pedals 11 and 12, a gear 13 connected to a rear wheel, not shown, a chain wheel 9 connected to crank 10, and a chain 14 interconnecting wheel 9 and gear 13. For present purposes, the bicycle frame and the means for changing the rotation ratio between gear 13 and crank 10 are not shown.

Superficially, an automatic shift control for a bicycle is as simple as passing chain 14 over an idler wheel 15 connected to an equilibrator spring 16. Since pedal effort exerted in riding a bicycle is reflected in chain tension, it would appear that if the effort on pedals 11 and 12 increased, idler wheel 15 would sense the increased tension in chain 14 by moving down, expanding spring 16. Conversely, if the tension in chain 14 decreases, idler wheel 15 would rise. Idler wheel 15 could then be connected to the bicycle's ratio changing means so that the motion thereof is used to shift gears.

However, and as mentioned previously, an examination of the forces involved indicates that in the simple configuration illustrated in FIG. 1A, the chain-tension sensing principle is inoperable. The reason for this can be seen in FIG. 1B where chain tension acting on idler 15 at its uppermost position, designated A, is represented by vectors $T_1$ which are always equal since chain tension will always be identical on either side of idler 15. The resultant force balanced by spring 16 is designated $R_1$ as developed in the classic parallelogram of forces.

Figure 1C:
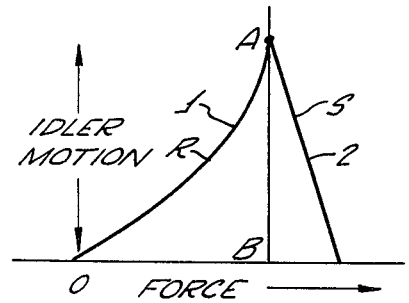
FIG. 1C is a graph of the forces of FIG. 1B.
Figure 1B:
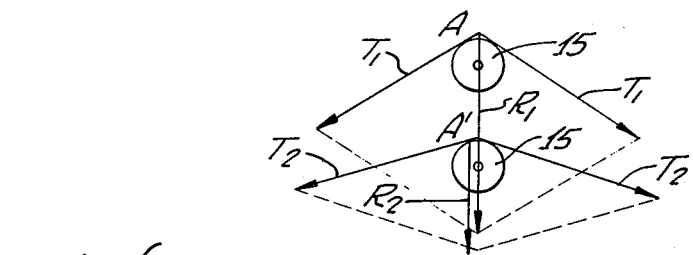
FIG. 1B is a diagramatic representation of the forces acting on the idler wheel of the shift control of FIG. 1A.

Assume now that to activate a shift mechanism, idler 15 moves down to an intermediate position, designated A' in FIGS. 1A and 1B. While it would have been urged to such new position by an increase in chain tension, the purpose of the shift control should be to keep chain tension constant. Therefore, in the new position, where the chain tension acting on idler 15 is represented by vectors $T_2$, $T_2$ should equal $T_1$. The resultant force in this new position is designated $R_2$. If the angle chain 14 forms as it passes over idler 15 is designated $\theta$, it is seen that as idler 15 moves down, $\theta$ increases and $R_2$ decreases. Thus, FIG. 1B shows that spring 16, when extended, is actually called upon to exert less of a restraining force on idler wheel 15, in order to balance the decreased chain tension resultant, than it did in the contracted position. Obviously, this is contrary to the operation of a spring.

The forces acting on idler 15 may also be represented by the graph shown in FIG. 1C. In FIG. 1C, the forces on idler 15 are plotted as a function of its movement between its uppermost position A and its lowermost position, designated B. A first curve 1 is a plot of the chain-tension resultant R whereas a second curve 2 is a plot of the force S of spring 16.

From an examination of FIG. 1C it is seen that as idler wheel 15 moves from point A to point B, the spring force S increases at a constant rate. On the other hand, the chain-tension resultant R decreases along a curve which reflects a cosine function. This cosine function is derived from the equation:

$$R = \sqrt{T_1^2 + T_1^2 + 2T_1T_1 \cosine \theta}, \text{ or} \quad (1)$$

$$R = \sqrt{2T_1^2 + 2T_1^2 \cos \theta}. \quad (2)$$

It will be recognized that if idler wheel 15 is to be in equilibrium at all points of its travel, both curves 1 and 2 should be increasing and should coincide. The closest this comes to happening is in the vicinity of point A in FIG. 1C, where the initial conditions have been established.

The conclusion seems clear. The simple chain-tension sensing configuration shown in FIG. 1A cannot work. The reason is that as idler wheel 15 moves downwardly, expanding spring 16, the force S exerted by spring 16 on idler wheel 15 will increase while the chain-tension resulting force R decreases. Furthermore, from equation (2), it will be noted that the resultant forces generated by chain tension over a range of chain-idler angles will be highly non-linear. Thus, such forces cannot be directly balanced by a linear spring.

An appraisal of the non-operative configuration shown in FIG. 1A establishes that the primary design problem is to develop a configuration in which the restraining force S on idler wheel 15 will be in very close balance with the chain-tension resultant R, for a selected value of pedal effort, over the entire range of travel of control idler wheel 15. Within this problem is the additional problem of converting the negative chain-tension resultant characteristic (the chain-tension resultant R decreases as the chain angle increases) to a positive response curve. If this can be achieved, a spring means may then be used for achieving equilibrium.

It will be further noted from an inspection of FIG. 1C that curves 1 and 2 diverge gradually at acute values of chain angle $\theta$ but diverge rapidly as $\theta$ becomes large. This is implicit from equation (2). Furthermore, "acute" for present purposes can be considered to be less than 70°. However, to achieve angles of 70° or less in the configuration of FIG. 1A, control idler 15 would have to be suspended above the seat of the bicycle and this is obviously impractical.

Figure 2A:
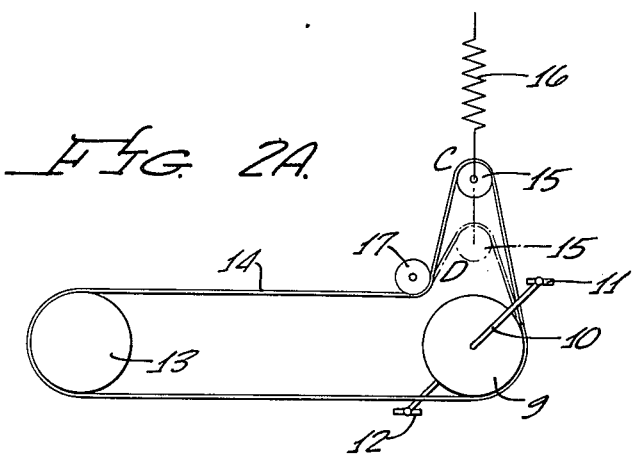
FIG. 2A is a diagramatic representation of a modified form of the shift control of FIG. 1A

The next step then is to introduce an additional fixed idler wheel 17, as shown in FIG. 2A. The purpose of idler wheel 17 is to effectively reduce the base of the chain triangle formed by the control idler wheel 15. Chain 14, rather than extending from idler wheel 15 directly to wheel 9 and gear 13, now extends between wheel 9 and fixed idler wheel 17.

Figure 2C:
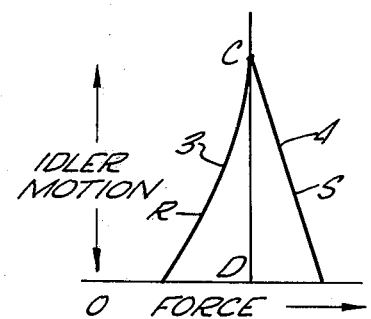
FIG. 2C is a graph of the forces acting on the idler wheel of the modified shift control of FIG. 2A.

With the configuration shown in FIG. 2A, idler 15 can still move vertically over a large enough distance to activate the transmission controls, but the angle $\theta$ of chain 14 will remain relatively acute. While the force diagram remains the same as FIG. 1B, the plots of those forces now appear as shown in FIG. 2C where curve 3 is a plot of the chain-tension resultant R and curve 4 is a plot of the spring force S as idler wheel 15 moves from its uppermost position, designated C, to its lowermost position, designated D. Curves 3 and 4, resulting from the motion illustrated in FIG. 2A should be contrasted with those shown in FIG. 1C resulting from the motion illustrated in FIG. 1A. While the force plots are still diverging, they are close enough that it now appears possible to change the negative characteristic of the chain-tension resultant, curve 3, to one that increases with distance. This final step is achieved by a pivoted control arm and is demonstrated in FIG. 3A.

Figure 3A:
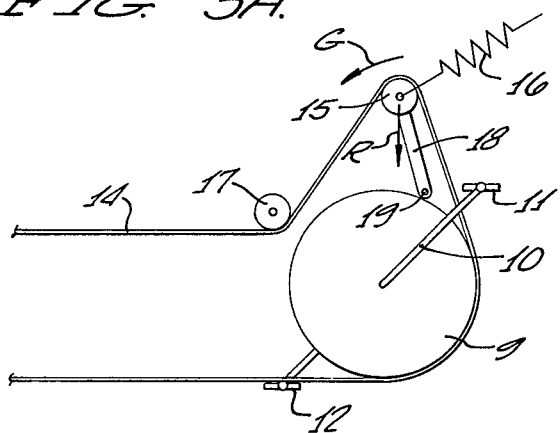
FIGS. 3A and 4A are diagramatic representations of the major elements of first and second embodiments of automatic shift controls for a bicycle constructed in accordance with the teachings of the present invention.

Referring now to FIG. 3A, there is shown a configuration wherein control idler wheel 15 is mounted at one end of a control arm 18, the other end of which is mounted for rotation around a fixed point 19 on the bicycle frame. As before, control idler 15 is restrained by spring 16 to balance the chain-tension resultant force R acting on arm 18 at idler 15. Rotation of arm 18, rather than the linear movement of control idler 15 is now the mechanism for effecting gear changes.

It will be seen from an inspection of FIG. 3A that the basic criterion for positioning control arm 18 is that pivot point 19 must be to one side of the extended chain-tension resultant R at control idler 15. This displacement is necessary in order to provide a turning moment to arm 18. Another criterion is that control arm 18 be free to rotate far enough within the chain geometry triangle to activate the transmission to which it will be linked.

Figure 3C:
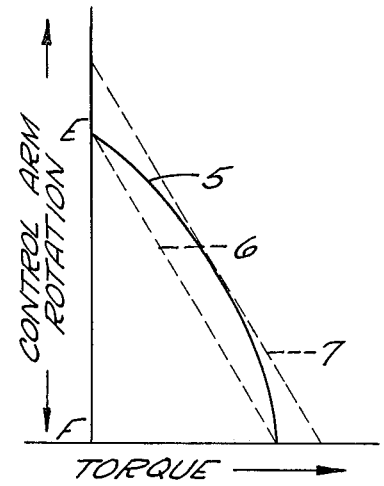
FIG. 3C is a graph of the forces of FIGS. 3B and 4B.
Figure 3B:
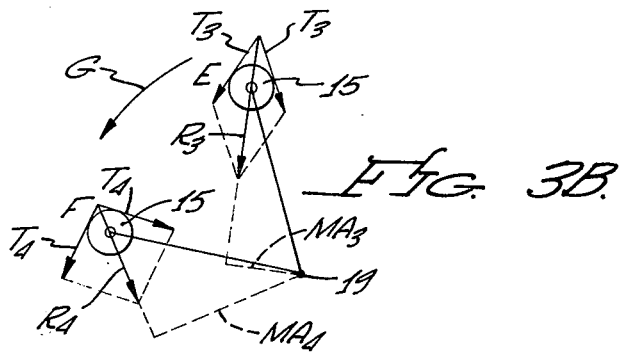
FIGS. 3B and 4B are diagramatic representations of the forces acting on the idler wheels of the shift controls of FIGS. 3A and 4A, respectively.

FIG. 3B shows an analysis of the forces acting on idler wheel 15 for the configuration of FIG. 3A. Using the notation established previously, chain tension acting on control idler 15 in its uppermost position, designated E, is represented by vectors $T_3$ with the resultant force designated $R_3$. Chain tension acting on idler 15 in its lowermost position, designated F, is represented by vectors $T_4$ with the resultant force designated $R_4$. If the system is in balance, $T_4 = T_3$. Analyzing the vector relations shown in FIG. 3B, it will be seen that although the chain-tension resultant $R_3$ at control idler position E is larger than the resultant $R_4$ at position F, $R_3$ acts through a smaller moment arm $MA_3$ than the moment arm $MA_4$ for resultant $R_4$. The result is that with a constant chain tension, the torque tending to cause rotation of control arm 18 in the direction of arrow G, shown in FIGS. 3A and 3B, increases as control arm 18 rotates from position E to position F.

The forces acting on control arm 18 may also be represented by the graph shown in FIG. 3C. In FIG. 3C, curve 5 is a plot of control arm torque as a function of the rotation of control arm 18 between positions E and F. It is readily seen that the control arm torque curve 5 is now positive. That is, the torque acting on arm 18 increases as the arm moves downward, from position E to position F. Therefore, the configuration of 3A achieves the desired objective.

On the other hand, it will also be noted that if the chaintension induced torque is to be directly equilibrated by spring 16, no more than two balance points are possible. In FIG. 3C, equilibrator spring 16 restraining force S is represented by two alternative straight-line curves 6 and 7, curve 6 being for a spring calibrated to balance control arm torque at points E and F and curve 7 being for a spring calibrated to balance control arm torque at the midpoint of chain-tension torque curve 5.

In any event, it will be seen that we now actually have a functional control system. While the system is not equilibrated for every point of control arm 18 rotation, it is close enough so that the increment of change of pedal effort from gear to gear will not immediately force a reverse shift. The actual increment of change of pedal effort that can be tolerated is determined by transmission characteristics. A 5-speed transmission will improve mechanical advantage in steps of about 20% between gears. Thus, there would be 4-pound steps between gears in maintaining an average 20-pound pedal effort. The difference between curve 5 and curves 6 or 7 in FIG. 3C is well within such a tolerance.

In fact, if the shift control system is calibrated to follow curve 7 in FIG. 3C, a unique advantage may be achieved. That is, the selected base pedal effort applies only to the middle gear and a greater pedal effort will be required to move into and stay in the upper and lower gears. The effect will be to extend the gear range. While the rider will exert greater effort in these gears, it will make good use of his reserve power capability since they are not normally used over extended periods of time. In practice, for example, the rider would make better speed ascending and descending hills without risking fatigue for the total span of his ride.

Figure 4A:
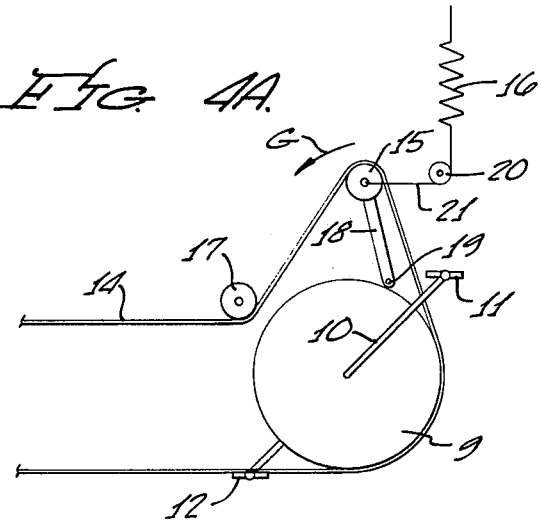

Referring now to FIG. 4A, there is shown a configuration wherein the chain force torque curve 5 of FIG. 3C can be fully equilibrated over the whole span of control arm 18 rotation. As shown in FIG. 4A, this is accomplished by transmitting the equilibrator spring force S to control arm 18 by means of a cable 21 passing over a fixed pulley 20 positioned immediately adjacent control arm 18.

Figure 4B:
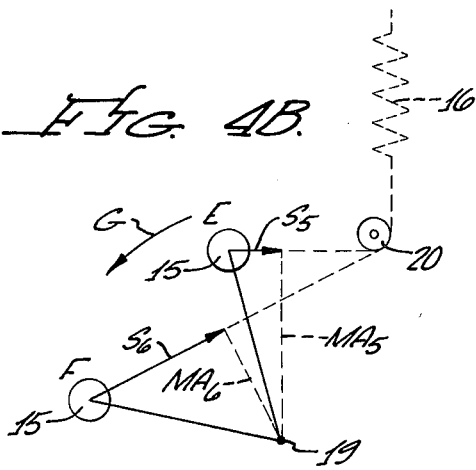

FIG. 4B shows an analysis of the spring forces acting on idler wheel 15 for the configuration of FIG. 4A. Using the notation established previously, the spring force acting on control idler 15 in its uppermost position E is represented by vector $S_5$ and the spring force on control idler 15 in its lowermost position F is represented by vector $S_6$. It will be seen in FIG. 4B that the result of this arrangement is to vary the restraining equilibrator spring force being applied to control arm 18. That is, it will be seen that although the spring force $S_5$ at control idler position E is smaller than the spring force $S_6$ at position F, $S_5$ acts through a longer moment arm $MA_5$ than the moment arm $MA_6$ for spring force $S_6$. The result is that the equilibrator torque curve 6, shown in FIG. 3C, will exactly coincide with the chain-tension torque curve 5.

Thus, in accordance with the present invention, there is provided an automatic shift control incorporating a chain-tension sensing configuration in which the torque of an equilibrator spring can be set to exactly balance the chain-tension torque which reflects the degree of pedal effort a rider may elect to exert. With such a configuration, control arm 18 is stable and can come to rest at any point in its constrained rotation as long as the chain tension is constant and held at the value for which the system is equilibrated. In use, if pedal effort is increased or decreased, control arm 18 will rotate down or up depending upon whether the chain-tension torque is greater or less than the equilibrator spring torque. Since such motion will be utilized to cause a shift to a higher or lower gear, pedal effort will return to the selected value and control arm 18 will again come to rest. Therefore, use of a pivoted control arm permits an automatic transmission control system to meet the basic functional criterion earlier stated. That is, this is a chain-tension sensing device that is stable in any gear position for a given pedal effort and responds only to the variations in chain tension caused by variations in pedal effort.

Description of Best Mode

Referring now to FIGS. 5–11, there is shown a conventional 5-speed bicycle 25 which has been modified to incorporate an automatic shift control, generally designated 30, constructed in accordance with the teachings of the present invention. To the extent that bicycle 25 is a conventional vehicle, the component parts thereof will not be described in detail. Suffice it to say that bicycle 25 includes a frame 26, a crank 10 which is rotated by a pair of pedals 11 and 12, a chain wheel 9 connected to crank 10, a gear cluster 13 connected to a rear wheel 22, a chain 14 interconnecting chain wheel 9 and gear cluster 13, and a derailleur mechanism, generally designated 23, for changing the rotation ratio between crank 10 and gear cluster 13.

Automatic shift control 30 operates on the chain-tension sensing principle described previously and requires no modification of the structure of bicycle 25 and is rapidly and easily installed on new bicycles and on those already in use. The major portions of automatic shift control 30 are arranged in an assembly, shown in FIGS. 6–10, positioned immediately above the chain wheel crank hanger 27 which is a part of frame 26.

Figure 6:
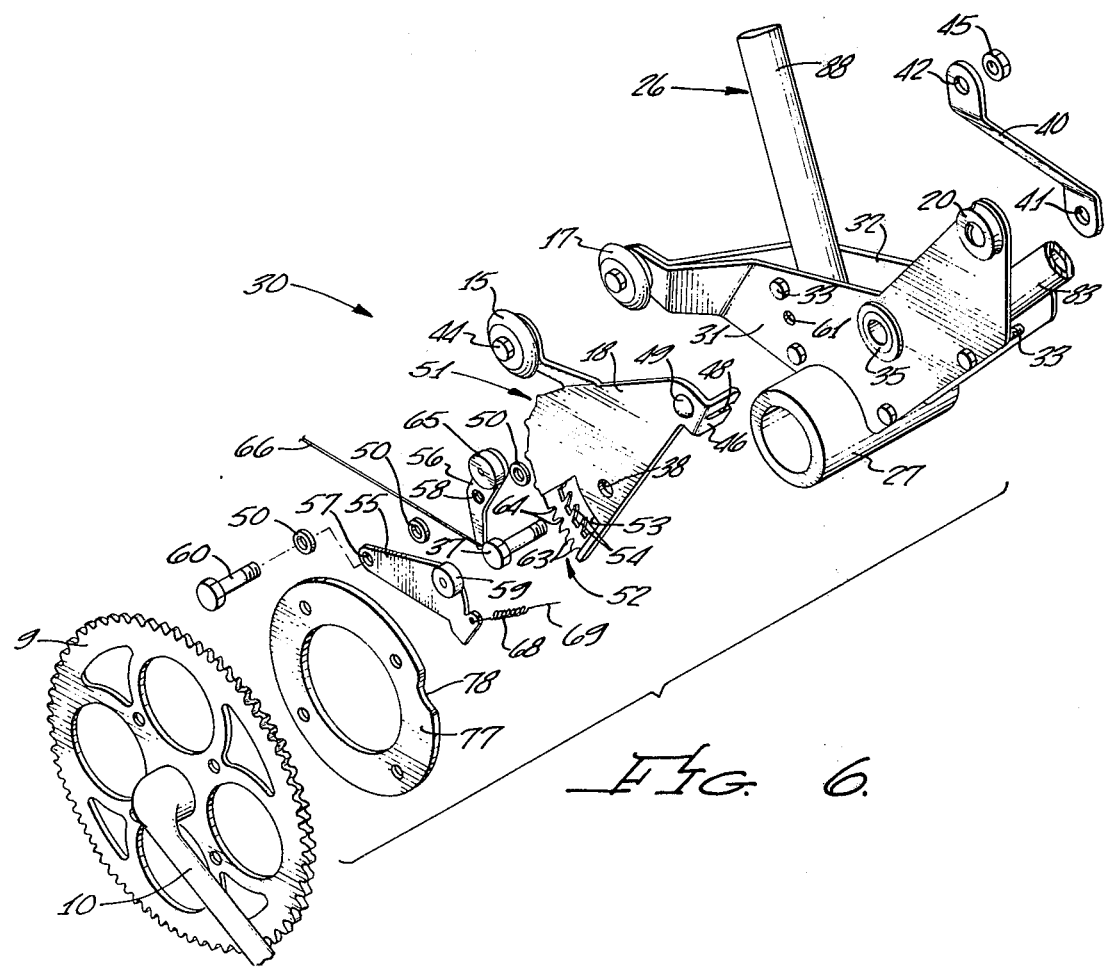
FIG. 6 is an exploded perspective view of the major elements of the automatic shift control of FIG. 5, taken from the front side thereof.
Figure 7:
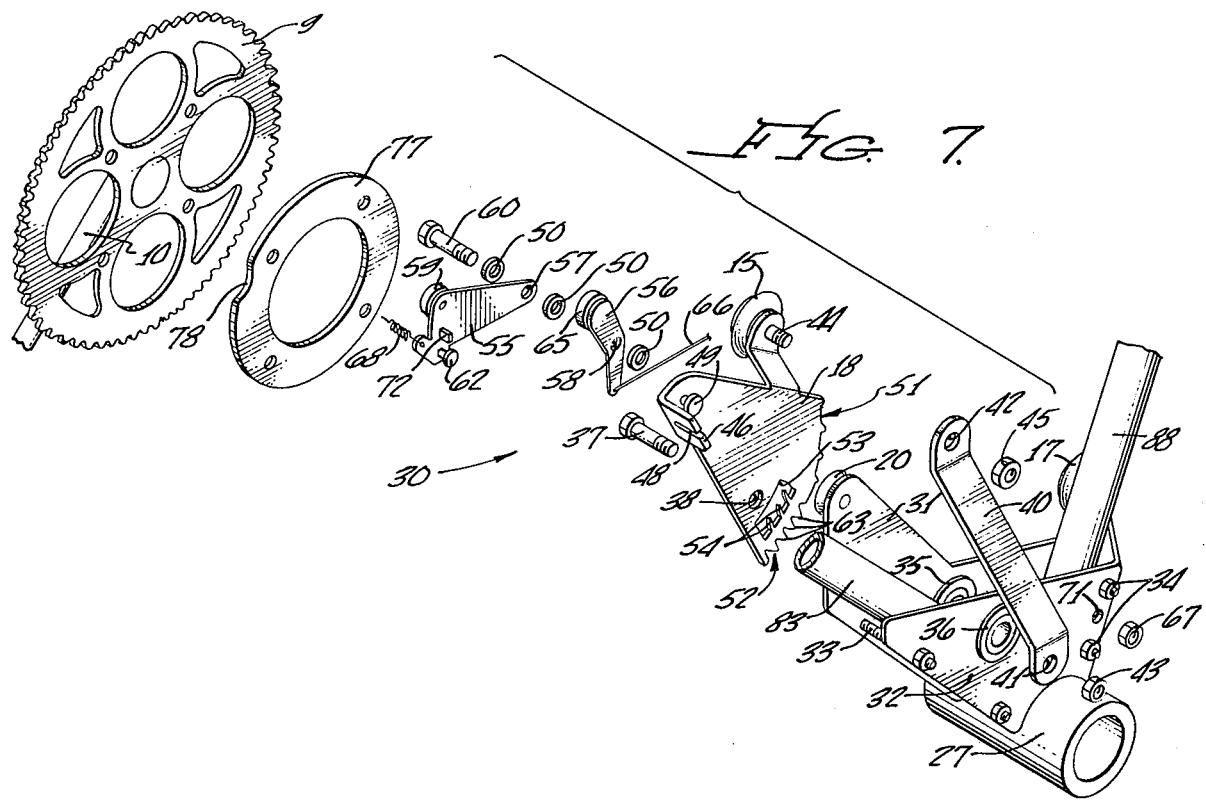
FIG. 7 is an exploded perspective view of the elements shown in FIG. 6, taken from the rear side thereof.

With reference primarily to FIGS. 6 and 7, the major elements of automatic shift control 30 are carried by front and rear base plates 31 and 32, respectively, which are connected to either side of frame 26, immediately above hanger 27. Plates 31 and 32 are preferably planar, sheet metal members which are secured together by welding or by means of a plurality of bolts 33 and nuts 34. It should be particularly noted in FIGS. 6 and 7 that the mounting bolts 33 may be positioned so that they not only secure plates 31 and 32 to frame 26 of bicycle 25 but they bear against the tubular elements of frame 26 to insure the correct orientation of the elements of shift control 30. Thus, mounting bolts 33 also lock plates 31 and 32 against any vertical or lateral motion.

Base plates 31 and 32 carry control arm bearings 35 and 36, respectively, which are secured to plates 31 and 32 in any suitable manner known to those skilled in the art. Front plate 31 also carries the equilibrator cable idler pulley 20 and the chain geometry fixed idler wheel 17, as will be described more fully hereinafter.

Automatic shift control 30 also includes a pivotable control arm, generally designated 18. Control arm 18 is pivotably connected to base plates 31 and 32 by means of a mounting bolt 37 which passes through a hole 38 in the body thereof and then through bearings 35 and 36. Control arm 18 is braced and further secured by an elongate strap 40 having holes 41 and 42 at the opposite ends thereof. Control arm mounting bolt 37, upon emerging from bearing 36 in rear base plate 32, passes through hole 41 in strap 40 and is secured by a nut 43. Control arm 18 supports an idler wheel 15 which is connected thereto by means of a bolt 44 which extends rearwardly from control arm 18 and then through hole 42 in strap 40. A nut 45 engages bolt 44 and completes the interconnection of strap 40 and control arm 18. Furthermore, and as will appear more fully hereinafter, bearings 35 and 36 support control arm 18 and strap 40 for pivotable movement about an axis defined by mounting bolt 37.

As described previously, control arm 18 is the key element of automatic shift control 30 since its rotation about bolt 37 serves to convert a decreasing chain-tension resultant force at idler 15 into an increasing control arm torque. This rotational movement of control arm 18 may be seen in FIG. 8 where control arm 18 is shown in solid lines in its uppermost position, corresponding to the high gear position, and in phantom lines in its lowermost position, corresponding to the low gear position.

Control arm 18 is positioned relative to frame 26 so that the chain-tension resultant force at idler 15 will impact a rotary motion to arm 18. As can be seen from FIGS. 5 and 8, and as discussed previously with regard to FIGS. 3A and 3B, the chain-tension resultant force is positioned to the left of mounting bolt 37 so as to correspond to the vector relationship shown in FIG. 3B. Upward motion of control arm 18 is halted by a leg 46 made integral with the body of control arm 18 which contacts pulley 20 just before the vector representing the chain-tension resultant would coincide with a line through idler 15 and bolt 37.

Rotation of control arm 18 through a large angle is desirable so that the various transmissions with which it will be linked can be easily operated. In practice, rotation will be restricted to less than 90° since the chain angle must remain acute, as earlier discussed. Furthermore, the chain-tension resultant will drop to zero if the path of chain 14 over idler wheel 15 should straighten out. This movement also corresponds approximately to the angle between the front and rear down-tubes 83 and 88, respectively, of frame 26, above hanger 27.

The length of control arm 18, i.e. the distance between idler wheel 15 and mounting bolt 37, is determined by transmission function. In the configuration shown, arm 18 will provide enough chain slack to allow engagement of both the smallest and the largest gears in a 5-speed derailleur cluster. A shorter arm, yielding a smaller amount of chain slack, could be employed for such transmissions as those using planetary gears.

As explained previously with regard to FIGS. 4A and 4B, the chain-tension resultant torque on control arm 18 is balanced by an equilibrator spring 16 which can be adjusted so as to establish the desired degree of pedal effort. As shown most clearly in FIGS. 5, 8, and 11, equilibrator spring 16 is preferably positioned immediately below and parallel to the top tube 81 of frame 26, with one end of spring 16 anchored to the seat tube 88, at 16'. A cable 21 secured to the other end of spring 16 passes over a pulley 47 positioned adjacent the steering head 89 of bicycle 25, to be described more fully hereinafter, and then under pulley 20 fastened to front base plate 31. Thereafter, cable 21 passes through a guide slot 48 in leg 46 of control arm 18 and is then anchored on control arm 18 by a suitable fastening element 49. By positioning pulley 47 close to fork 89 of bicycle 25 and by guiding cable 21 next to front downtube 83 of bicycle 25, cable 21 is inconspicuous and protected.

As seen most clearly in FIGS. 6–10, control arm 18 incorporates, on the side thereof facing gear cluster 13, both a cam sector, generally designated 51, and a detent sector, generally designated 52, both of which will be described more fully hereinafter. However, it should be recognized that cam sector 51 and detent sector 52 are elements of other mechanisms included in automatic shift control 30 which are operated by rotation of control arm 18. While the functions of sectors 51 and 52 could be performed by separate elements, utilization of the body of control arm 18 is preferable since this substantially simplifies the transmission control mechanism. It further assures absolute registration and synchronism between the related functions sectors 51 and 52 control.

As shown most clearly in FIGS. 6, 7, 9, and 10, control arm 18 also has an opening 53 therein, positioned immediately above detent sector 52, control arm 18 also incorporating a plurality of teeth 54 which are positioned opposite to detent sector 52 and extend into opening 53.

Automatic shift control 30 also includes a shift position detent arm 55 and a shift control crank 56. Detent arm 55 has a hole 57 at one end thereof whereas shift control crank 56 has a central hole 58 therein. A mounting bolt 60 passes through holes 57 and 58 in arm 55 and crank 56, respectively, through a plurality of sleeve bearings 50, and then into and through holes 61 and 71 in front and rear base plates 31 and 32, respectively. A nut 67 completes the attachment and permits pivotal movement of both arm 55 and crank 56 on the common axle defined by bolt 60, a feature that reduces complexity and simplifies assembly.

As shown most clearly in FIGS. 7, 9, and 10, detent arm 55 carries a detent pin 62 which extends rearwardly thereof and engages detent sector 52. More specifically, detent sector 52 includes a plurality of teeth 63 defining notches 64 therebetween which are positioned relative to control arm 18 so that precisely enough slack in chain 14 is provided to accomplish the shift. As shown in FIG. 9, detent pin 62 on detent arm 55 extends between detent sector teeth 63, into notches 64. With detent arm 55 in its uppermost position, shown in FIGS. 8 and 9, control arm 18 is maintained in one of a plurality of positions determined by the number of teeth 63 in sector 52. However, downward pivotal movement of detent arm 55, around bolt 60, permits rotation of control arm 18, as will be explained more fully hereinafter, detent pin 62 eventually falling into a notch 64 between a different pair of teeth 63.

Figure 8:
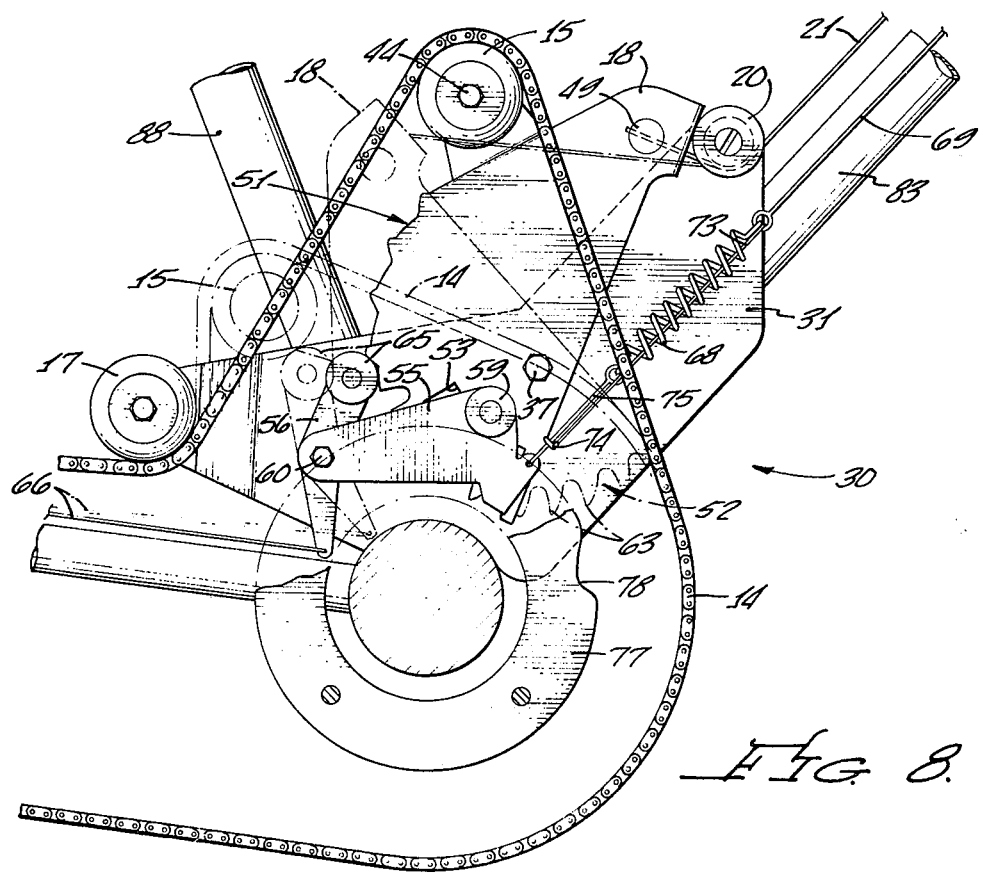
FIG. 8 is a front elevation view of the assembled elements of FIGS. 6 and 7 with the control arm shown in solid lines in its uppermost position and in phantom lines in its. lowermost position.

Shift control crank 56 supports, adjacent one end thereof, a cam follower 65 positioned, as shown in FIG. 8, so as to rest on cam sector 51 of control arm 18. As control arm 18 rotates in a counterclockwise direction, as viewed in FIG. 8, cam sector 51 is contoured so as to cause a corresponding counterclockwise rotation of crank 56 about its mounting bolt 60 as cam follower 65 rides on cam sector 51. The other end of shift control crank 56 is connected to one end of a cable 66 connected to a conventional spring biased derailleur mechanism 23. Thus, cam sector 51 of control arm 18, in conjunction with cam follower 65 on shift control crank 56, acts to synchronously shift transmission 23 at the appropriate time and position.

The specific cam levels shown in the drawings provide for a 5-speed derailleur transmission. Other transmissions can be accommodated by suitably contoured cam outlines. A second cam controlling a front derailleur can be employed for 10-speed transmissions. A plurality of small lips 67 in cam sector 51 serve to provide a slight, transitory over-shift action to compensate for static friction and cable elasticity.

Returning to FIGS. 6–10, detent arm 55 has the function of holding control arm 18 in precise registration for a given gear. For this purpose, shift control 30 includes a spring 68, one end of which is anchored to arm 55, adjacent detent pin 62, the other end of which is connected by a cable 69 to the shift range control 70. Thus, spring 68 biases detent arm 55 upwardly, with detent pin 62 in one of notches 64 between detent sector teeth 63. With detent pin 62 in one of notches 64, the rotational forces acting on control arm 18 are resisted. As shown most clearly in FIGS. 9 and 10, the surfaces of teeth 63 are slightly sloping so that the forces tending to cause rotation of control arm 18 generate a component which tends to lift pin 62 out of notch 64. This action is resisted by static friction and by the loading of detent arm 55 caused by spring 68. However, if these restraining forces are overcome, either because the chain-tension resultant torque is sufficiently greater than the equilibrator spring torque, or vice versa, detent pin 62 will move down, to the position shown in FIG. 10, and control arm 18 will rotate to place detent pin 62 in the next notch 64 between teeth 63. Furthermore, once begun, the action is positive because the decreasing slope of detent sector teeth 63 increases the force component tending to move the detent pin 62 out of notch 64 between teeth 63.

As an additional feature of the present invention, the outline of detent teeth release is made with less force for down shifts than for up shifts. This serves to balance the resistance encountered by the shift control cam follower 65 in ascending each ramp of cam sector 51 to a specific shift position. This ascension of cam follower 65 is resisted by the spring incorporated within derailleur mechanism 23. Obviously, when the procedure reverses, the spring in derailleur mechanism 23 is working with cam follower 65 rather than against it.

It is possible that under a surge load, which might be caused by a rider briefly standing on pedals 11 and 12, detent pin 62 will jump detent teeth 63. Although derailleur mechanism 23 can shift over several gears at once, such an action, when initiated by a rider, is usually an admission that the shift was too long deferred, which is not possible with the present automatic shift control 30. Such an action also incurs the hazard of failure of shift linkages and of chain failure or loss. Accordingly, an escapement mechanism, including opening 53 and teeth 54 in control arm 18 in conjunction with a release pin 72 mounted on the back of detent arm 55, immediately above detent pin 62, insures that each detent is fully engaged in turn.

More specifically, and with reference to FIGS. 9 and 10, it is seen that release pin 72 extends into opening 53 in arm 18, above teeth 54 when detent pin 62 is positioned in one of notches 64 between teeth 63. On the other hand, as detent arm 55 rotates in a counterclockwise direction, as viewed in FIGS. 9 and 10, around mounting bolt 60, release pin 72 moves downwardly into a position between teeth 54. By properly locating teeth 54, it is seen that if control arm 18 should try to rotate without giving detent pin 62 time to drop into the next notch 64 between teeth 63, pin 73 will be blocked by one of teeth 54 in opening 53 in control arm 18. Arm 18 will only be released if detent pin 62 moves into full engagement in the appropriate detent notch 64 whereupon pin 72 moves above teeth 54. This action, in conjunction with a detent release mechanism to be described more fully hereinafter, insures that no matter how heavy the pedal loading, gears will be sequentially shifted from one end of the range to the other.

It has been noted previously that detent arm 55 is held in engagement with detent sector 52 by spring 68. Thus, it will be apparent that the relative force of spring 68 determines at what point the forces on control arm 18 will drive detent pin 62 out of engagement with one of notches 64 between adjacent teeth 63 and initiate a shift. In this regard, it will be recalled from the discussion of FIGS. 3A and 4A that as long as the force on pedals 11 and 12 is sustained at the selected level, control arm 18 is in equilibrium with the chain-tension resultant torque balanced by the equilibrator spring torque and not forces act to dislodge detent pin 62. On the other hand, as soon as one torque exceeds the other, there is a force tending to cause rotation of control arm 18. Because the force of spring 68 determines the disengagement threshold of detent pin 62, it also determines the shift range, that is, the increment of force over or under the selected pedal force which will trigger a shift. Thus, variation of the force of spring 68 will vary the shift range.

Figure 5:
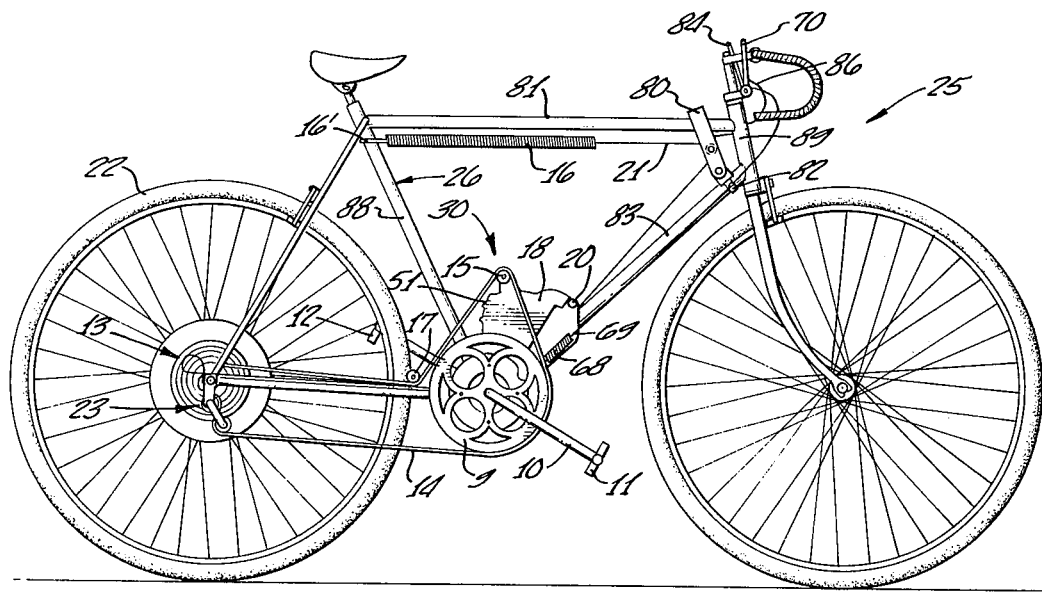
FIG. 5 is a front elevation view of a complete bicycle incorporating the present automatic shift control.

The complete shift range control mechanism is seen in FIGS. 5 and 6. Automatic shift control 30 utilizes conventional bicycle elements, including the left and right stem mounted derailleur controls. The right stem mounted derailleur control 70 is utilized as the shift range control and also acts to selectively lock derailleur mechanism 23 in any gear. More specifically, cable 69 extends along front down-tube 83 of frame 26 of bicycle 25 to shift range and lock control 70. A conventional downward motion of control lever 70 pulls cable 69, thereby extending spring 68 and increasing the force thereof, requiring a greater differential torque on control arm 18 before a shift is initiated. Furthermore, continued motion of control lever 70 will lock mechanism 23 in whatever gear is engaged. The linkage that accomplishes the above is shown in FIG. 8. That is, an additional control cable 73 has one end thereof connected to one end of cable 69, the body of which extends through spring 68. The other end of control cable 73 is connected to a ring fitting 74, through which passes a short length of rigid wire 75 connected between spring 68 and detent arm 55.

It will be seen from an inspection of FIG. 8 that as cable 69 is taken up by the motion of control lever 70, spring 68 will extend and ring fitting 74 will slip along connection wire 75. Thus, as the tension of spring 68 increases, it will require a correspondingly greater torque on control arm 18 to break loose from a given detent position. However, as cable 69 continues to be retracted, ring 74 will eventually engage the end of spring 68 and thus act to prevent expansion thereof. Since detent pin 62 cannot now drop out of engagement with detent sector 52 of control arm 18, the transmission is locked.

Referring now to FIGS. 6-10, automatic shift control 30 further includes a detent release cam 77, a disc-shaped element, secured to the inside of chain wheel 9, preferably by being bolted thereto. The perimeter of detent release cam 77 is perfectly circular except for a small notch 78. As seen in FIGS. 6 and 8, detent arm 55 supports a detent release cam follower 59 on the front thereof, cam follower 59 being so positioned that it contacts the perimeter of detent cam 77. As shown most clearly in FIG. 8, as long as the circular portion of cam 77 engages cam follower 59, the transmission is locked, i.e. no shifting can occur. That is, cam 77 prevents rotation of detent arm 55 and without such rotation, detent pin 62 on the back of detent arm is held in one of the notches 64 between adjacent detent sector teeth 63, preventing motion of control arm 18.

On the other hand, notch 78 is positioned so that when pedal 11 is in the forward position, notch 78 passes beneath cam follower 59 and, for approximately a tenth of a second, at a rotation rate of 60 RPM, detent arm 55 is free to rotate downwardly and initiate a shift. Such action, of course, will only occur if the shift range is exceeded, as established by spring 68 and shift range control 70.

Many studies have indicated that pedal effort at the point of maximum torque, when the pedals are horizontal, is remarkably consistent for riders of all degrees of experience. Therefore, detent release cam 77, in cooperation with cam follower 59 on detent arm 55, functions to sample pedal effort at precisely that point. It will therefore be seen from the geometry described that shifts can occur, if needed, at the rate of approximately once per second.

Referring now to FIGS. 5, 8, and 11, the torque on control arm 18 induced by tension in chain 14 is balanced by equilibrator spring 16. The force of spring 16 is transmitted to control arm 18 by capable 21 passing over pulley 47 mounted in a pedal effort control arm 80. That is, arm 80 is a U-shaped member which extends over top tube 81 of frame 26 of bicycle 25. Pulley 47 is mounted between the opposite ends of arm 80. The open ends of arm 80 are pivotably connected by a bracket to front down-tube 83 of frame 26 of bicycle 25, immediately behind steering head 89. The left conventional stem mounted derailleur control 84 is used to extend equilibrator spring 16 by means of a cable 85 passing through a guide 86 and a shroud-stop 87 secured to steering head 89. Cable 85 is then anchored to pedal effort arm 80, as shown. Thus, movement of pedal effort control lever 84 rearwardly, to the position shown in phantom in FIG. 11, pulls pedal effort arm 80 and pulley 47 forwardly to the position shown in phantom in FIG. 11. By reason of the fact that equilibrator cable 21 passes over pulley 47, the expansion of spring 16 will be greater than the motion of arm 80. This permits relatively large spring adjustments to be made with relatively small movements of control lever 84.

The configuration shown in FIGS. 5 and 11 utilizes an external coil equilibrator spring for simplicity of adjustment. If desired, shift control 30 could be made completely self-contained by use of an appropriately sized torsion spring equilbrator secured to control arm 18 between base plates 31 and 32. Other modifications will be obvious to those skilled in the art.

Of obvious significance is the spring constant of equilibrator spring 16. That characteristic is directly defined by the pedal effort range for which the system is designed. On the other hand, a proportionate positioning of pulley 20 and cable fastening element 49 can be used to shape spring dimensions. In any event, the configuration shown in the present drawing uses a relatively large spring having a relatively low spring constant in order to reduce tension in cable 21 and stress on the system elements. A preferred base force for spring 16 is on the order of 25 pounds and the maximum is 50 pounds. Pedal effort can therefore be adjusted from some 20 pounds to more than 30.

Summarizing the operation of automatic shift control 30, shift control 30 incorporates a chain-tension sensing configuration in which the torque of equilibrator spring 16 transmitted to control arm 18 by cable 21 is set to exactly balance the torque on control arm 18 as a result of tension in chain 14, which chain-tension torque reflects the degree of pedal effort a rider may elect to exert. The desired pedal effort is adjusted by manipulating pedal effort control 84, thereby establishing the tension of spring 16. As long as the chain-tension torque exactly equals the torque of equilibrator spring 16, control arm 18 is in equilibrium and there is no tendency for rotation thereof in either direction.

On the other hand, if the actual pedal effort increases or decreases so that there is a difference between the chain-induced torque and the equilibrator spring torque, control arm 18 will be urged to rotate in the direction of the greater torque. Since detent pin 62 bears against the sloping surfaces of teeth 63, the rotational force generates a component which tends to lift pin 62 out of notch 64 between adjacent teeth 63. This action is resisted by spring 68 and prevented by cam 77. However, when pedal 11 is in the forward position so that notch 78 passes beneath cam follower 59, detent arm 55 is free to rotate. If the rotational forces on control arm 18 exceed the force of spring 68, which may be adjusted by shift range control 70, detent pin 62 will move downwardly and arm 18 will rotate to place detent pin 62 in the next notch 64. As described previously, teeth 54 in conjunction with release pin 72 will prevent detent pin 62 from moving beyond the next notch 64.

As control arm 18 rotates, cam follower 65 travels along cam sector 51 on arm 18, causing rotation of shift control crank 56 around its mounting bolt 60. In the configuration shown, crank 56 is connected by cable 66 to the rear wheel derailleur mechanism 23. The derailleur retracting spring (not shown) tensions cable 66 and thus acts through crank 56 to bring cam follower 65 into solid contact with cam sector 51 of control arm 18.

It should be noted that the use of a cam to effect a shift permits the motion of cable 66 to be precisely matched to the requirements of a given shift mechanism. These mechanisms do not always have linear control characteristics, but this is easily accommodated. Furthermore, in the case illustrated here, the motion of control arm 18 is also nonlinear because varying amounts of chain slack must be provided for each gear position. The reason for this is because increments of difference in the diameters of the gears in rear wheel gear cluster 13 are not consistent.

In automatic shift control 30, control arm 18 is stable and can come to rest at any point in its constrained rotation as long as the chain tension is constant and held at the value for which the system is equilibrated. If pedal effort is increased or decreased, control arm 18 will rotate down or up, depending upon whether the chain-tension torque is greater or less than the equilibrator spring torque. Since such rotation of control arm 18 will be utilized to cause a shift to a higher or lower gear, pedal effort will return to the selected value and control arm 18 will again come to rest. Therefore, automatic shift control 30 meets the basic functional criterion earlier stated and described in detail. That is, automatic shift control 30 is a chain-tension sensing device that is stable in any gear position for a given pedal effort and responds only to the variations in chain tension caused by variations in pedal effort.

Derailleur Improvement

The output of automatic shift control 30 is a linear motion of cable 66 which can be adapted to operate a large variety of variable gear devices. The most common device is the derailleur and is used here as an example of the character of transmission improvement permitted by the use of automatic shift control 30. In other words, although automatic shift control 30 can be used directly with conventional derailleur mechanisms, its special characteristics permit derailleur mechanism 23 to be improved to provide more postive and more rapid shifting. The characteristic of automatic shift control 30 which permits derailleur mechanism 23 to be improved results from the fact that the movement of control arm 18 provides all of the chain slack required for the several gears used in derailleur transmission systems.

Referring to FIG. 12, a conventional derailleur mechanism 23 accomplishes the derailing action from gear to gear at the rear hub cluster 13 by means of a jockey or guide pulley 90 connected to the bicycle frame by a pivotable arm 91. The slack in chain 14 is taken up by a tension pulley 92 pivotably connected to jockey pulley 90 by an arm 93. Chain 14 is shifted or derailed by a mechanism which moves pulleys 90 and 92 from alignment with one gear of cluster 13 to alignment with another. Chain 14 is thus stripped from one gear and placed on another.

Manual derailleur shifting demands a fair degree of skill because a certain amount of "over-shifting" is required in order to obtain a quick and certain shift. The reason is that the distance between the point of contact of chain 14 from gear cluster 13 to jockey pulley 90 is approximately 3.5 inches. A number of derailleur mechanism schemes attempt to minimize this distance but a number of considerations, not here relevant, make the stated distance fairly typical. With such a distance, when jockey pulley 90 is moved into alignment with one gear with chain 14 engaged with an adjacent gear, chain 14 slips erratically before random chance finally lifts chain 14 high enough for a link to be firmly seated upon or over a gear tooth. It will then carry the rest of chain 14 around to full engagement. The only way to avoid this is over-shifting, which serves to speed a positive chain engagement by angling the chain over the gear to be engaged. Link and gear tooth contact are then considerably more positive. However, once engaged, jockey pulley 90 must be returned to its normal position in line with the engaged gear.

FIGS. 13 and 14 show what simple modification of derailleur mechanism 23 is permitted with the present invention. As shown in FIGS. 13 and 14, the pulley 90 originally used as the jockey pulley is converted to a tension pulley by spring loading arm 93 to rotate upwardly, toward gear cluster 13. Pulley 92 now becomes the jockey pulley. Spring loading of arm 93 insures that pulley 92 has positive control of chain 14.

From an inspection of FIGS. 13 and 14 it is seen that derailleur mechanism 23 now no longer provides the degree of slack adjustment required previously. However, a shift operation with pulley 92 immediately adjacent to each gear in cluster 13 now becomes possible because shift control 30 meter exactly the right amount of chain slack for each gear in cluster 13. Thus, in a down shift, the shift slack is provided simultaneously with the derailleur shift motion. Pulley 90 then moves back and down and permits jockey pulley 92 to move out and far enough to both clear and place the chain solidly upon the next gear.

Since the configuration of FIGS. 13 and 14 positions jockey pulley 92 close to each gear of cluster 13, chain 14 now passes directly over each gear, not next to the gear to which it is being derailed. This is equivalent to, or even better than, an over-shift geometry. The result is that with a configuration shown in FIGS. 13 and 14, chain 14 is promptly and positively stripped from one gear and engaged on the next with substantially reduced strain and friction.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. An automatic shift control for a vehicle including a frame, at least one wheel, a crank, a chain interconnecting said wheel and said crank, and a means for changing the rotation ratio between said wheel and said crank comprising:

a control arm mounted for rotation around a fixed point on said frame, said arm being positionable in any one of multiple positions;

means interconnecting said control arm and said ratio changing means for selecting one of multiple ratios depending upon the position of said control arm;

a control arm idler wheel mounted on said control arm, said chain extending over said control arm idler wheel and forming an acute angle relative thereto, the resultant chain-tension force being in a direction to cause rotation of said control arm in a first direction; and tension means connected to said control arm for applying a force in a direction to cause rotation of said control arm in a second direction opposite to said first direction, said control arm being approximately in equilibrium for a selected chain tension in all of said multiple positions of said control arm.

2. An automatic shift control for a vehicle according to claim 1 wherein only a difference between actual chain tension and said selected chain tension causes rotation of said control arm in a direction to eliminate said difference.

3. An automatic shift control for a vehicle according to claim 2 wherein said control arm rotates in said first direction when the actual chain tension exceeds said selected chain tension by a predetermined amount and wherein said control arm rotates in said second direction when said selected chain tension exceeds the actual chain tension by said predetermined amount.

4. An automatic shift control for a vehicle according to claim 3 further comprising:

means for selecting the value of said selected chain tension.

5. An automatic shift control for a vehicle according to claim 4 further comprising:

means for selecting the value of said predetermined amount of difference between actual and selected chain tension.

6. An automatic shift control for a vehicle according to claim 3 further comprising:

means for selecting the value of said predetermined amount of difference between actual and selected chain tension.

7. An automatic shift control for a vehicle according to claim 3 wherein said control arm includes a detent sector in one side edge thereof, said detent sector including a plurality of teeth defining notches therebetween, said notches defining said multiple positions of said control arm.

8. An automatic shift control for a vehicle according to claim 7 further comprising:

a shift position detent arm mounted at one end thereof for rotation around a fixed point on said vehicle frame, said control arm and said shift position detent arm rotating in parallel, spaced planes about parallel axes;

a detent pin mounted on the other end of said detent arm and extending outwardly therefrom into one of said notches of said detent sector; and a spring connected to said other end of said shift position detent arm for biasing said detent arm with said detent pin in one of said detent notches, said detent arm holding said control arm in one of said multiple positions.

9. An automatic shift control for a vehicle according to claim 8 wherein the surfaces of said detent sector teeth are sloping so that said forces tending to cause rotation of said control arm in either said first or said second direction generate a component which tends to lift said detent pin out of said detent sector notches, movement of said detent pin out of said notches being resisted by the force of said spring, said spring thereby controlling the value of said predetermined amount of difference between actual and selected chain tension.

10. An automatic shift control for a vehicle according to claim 9 further comprising:
means for selecting the value of said predetermined amount of difference between actual and selected chain tension, said selecting means comprising means for adjusting the tension of said spring.

11. An automatic shift control for a vehicle according to claim 9 wherein said control arm has an opening therein, positioned adjacent said detent sector, said control arm including a plurality of escapement teeth positioned opposite said detent sector teeth and extending into said opening in said control arm and further comprising:
a release pin mounted on said other end of said shift position detent arm and extending outwardly therefrom, adjacent said detent pin, into said opening in said control arm, said release pin being positioned out of contact with said escapement teeth when said detent pin is positioned in one of said detent sector notches, said release pin moving into a position between adjacent escapement teeth as said detent pin moves from one detent sector notch to an adjacent detent sector notch to prevent further movement of said control arm until said detent pin is fully engaged in said adjacent notch.

12. An automatic shift control for a vehicle according to claim 9 further comprising means for preventing movement of said control arm except when said crank is in one of a limited number of selected positions, said control arm movement preventing means comprising:
a disc-shaped detent release cam connected to said crank, the perimeter of said cam being perfectly circular except for at least one small notch therein; and
a detent release cam follower mounted on said other end of said shift position detent arm, said cam follower contacting said perimeter of said detent cam, said circular portion of said cam preventing pivotal movement of said shift position detent arm with said detent pin being held in one of said notches of said detent sector, preventing motion of said control arm.

13. An automatic shift control for a vehicle according to claim 12 wherein said crank has a pair of opposed pedals connected thereto, said at least one notch in said detent release cam passing beneath said cam follower when one of said pedals is in a forward position, said detent arm being free to rotate to move said detent pin to an adjacent notch, said cam follower moving into said notch in said cam.

14. An automatic shift control for a vehicle according to claim 1 further comprising:
means for preventing movement of said control arm except when said crank is in one of a limited number of selected positions.

15. An automatic shift control for a vehicle according to claim 14 wherein said crank has a pair of opposed pedals connected thereto and wherein said control arm movement preventing means prevents movement of said control arm except when said pedals are approximately horizontal.

16. An automatic shift control for a vehicle according to claim 1 wherein said control arm moves between said multiple positions in a given sequence and further comprising:
means for preventing movement of said control arm by more than one position in said sequence for each complete rotation of said crank.

17. An automatic shift control for a vehicle according to claim 1 wherein said chain extends around said crank, over said idler wheel, and around a gear mounted coaxially with said wheel and further comprising:
at least one chain-engaging idler wheel fixedly mounted on said frame and positioned relative to said control arm so as to maintain a relatively acute chain angle over said control arm idler wheel in all of said multiple positions of said control arm.

18. An automatic shift control for a vehicle according to claim 17 wherein the length of said control arm, the position thereon of said control arm idler wheel relative to said fixed point on said frame, and said angle of said chain over said control arm idler wheel are selected so that as said resultant chain-tension force decreases, the moment arm through which said force acts increases at a rate such that the torque tending to cause rotation of said control arm in said first direction increases as said control arm rotates in said first direction.

19. An automatic shift control for a vehicle according to claim 18 wherein said tension means comprises:
a spring connected between said frame and said control arm, said spring extending and applying a greater force to said control arm as said control arm rotates in said first direction, said increased force of said spring approximately balancing said chain-tension-induced increasing torque.

20. An automatic shift control for a vehicle according to claim 19 wherein said tension means further comprises:
a pulley mounted on said frame; and
a cable extending around said pulley and interconnecting said spring and said control arm, the position of said pulley relative to said control arm and the value of the force of said spring being selected so that as said force fo said spring increases, the moment arm through which said force acts changes at a rate such that the torque tending to cause rotation of said control arm in said second direction remains approximately equal to said chain-tension-induced torque for said selected chain tension in all of said multiple positions of said control arm.

21. An automatic shift control for a vehicle according to claim 19 further comprising:
means for selecting the value of said selected chain tension.

22. An automatic shift control for a vehicle according to claim 21 wherein said means for selecting the value of said selected chain tension comprises:
means for adjusting the tension of said spring.

23. An automatic shift control for a vehicle according to claim 1 wherein said rotation ratio changing means comprises a multiple gear derailleur mechanism connected to said at least one wheel and wherein said control arm provides the amount of slack required to permit engagement of all of the gears of said derailleur mechanism as said control arm moves between said multiple positions.

24. An automatic shift control for a vehicle according to claim 1 wherein said control arm has a cam surface on one side thereof and wherein said means interconnecting said control arm and said ratio changing means comprises:

a shift control crank mounted for rotation around a fixed point on said frame, spaced from said control arm fixed point;

a cam follower mounted on said shift control crank in position to rest on said cam sector of said control arm, rotation of said control arm causing rotation of said shift control crank; and a cable connected between said shift control crank and said ratio changing means for changing the selected one of multiple ratios as said control arm rotates.

* * * * *